United States Patent
Pate et al.

(10) Patent No.: US 8,159,414 B2
(45) Date of Patent: Apr. 17, 2012

(54) KEYBOARD WITH INTEGRATED AUXILIARY DISPLAY

(75) Inventors: Christopher Pate, Fremont, CA (US);
Mark Lavelle, San Mateo, CA (US);
David Wegmuller, Palo Alto, CA (US);
Roland Bosa, Fremont, CA (US);
Nanda Kutty, Union City, CA (US);
Vahid Afshar, San Carlos, CA (US);
Aidan Kehoe, Fremont, CA (US);
Thomas Burgel, Newark, CA (US)

(73) Assignee: Logitech Europe S.A., Morges (CH)

( * ) Notice: Subject to any disclaimer, the term of this patent is extended or adjusted under 35 U.S.C. 154(b) by 669 days.

(21) Appl. No.: 11/155,972

(22) Filed: Jun. 17, 2005

(65) Prior Publication Data

US 2006/0284846 A1    Dec. 21, 2006

(51) Int. Cl.
*G09G 5/00* (2006.01)

(52) U.S. Cl. .............................. 345/1.1; 341/22; 345/168

(58) Field of Classification Search .......... 345/168–172, 345/1.1; 710/19, 40, 41, 240, 244; 341/23, 341/22; 715/771–773
See application file for complete search history.

(56) References Cited

U.S. PATENT DOCUMENTS

| | | | | |
|---|---|---|---|---|
| 3,940,758 | A * | 2/1976 | Margolin | 345/169 |
| 4,922,448 | A * | 5/1990 | Kunieda et al. | 713/320 |
| 5,936,554 | A | 8/1999 | Stanek | |
| 6,018,335 | A | 1/2000 | Onley et al. | |
| 6,081,207 | A | 6/2000 | Batio | |
| 6,107,996 | A | 8/2000 | Franz et al. | |
| 6,191,758 | B1 * | 2/2001 | Lee | 345/2.2 |
| 6,532,149 | B2 * | 3/2003 | Dhar et al. | 361/683 |
| 6,979,140 | B2 | 12/2005 | McLoone et al. | |
| 7,660,914 | B2 * | 2/2010 | Perez et al. | 710/15 |
| 2002/0110401 | A1 * | 8/2002 | Gershuni | 400/703 |
| 2003/0067446 | A1 | 4/2003 | Ono et al. | |
| 2003/0100347 | A1 | 5/2003 | Okada et al. | |
| 2004/0036632 | A1 * | 2/2004 | Ford | 341/23 |
| 2004/0036679 | A1 | 2/2004 | Emerson | |
| 2004/0174341 | A1 * | 9/2004 | Gershuni | 345/168 |
| 2005/0179664 | A1 | 8/2005 | Lee | |
| 2006/0284847 | A1 | 12/2006 | Pate et al. | |

OTHER PUBLICATIONS

Sandlin, Jason. "Disabling shortcut keys in game". Dec. 2004. < http://msdn.microsoft.com/en-us/library/bb219746(VS.85).aspx >.*
Non-Final Office Action for U.S. Appl. No. 11/156,213 mailed on Mar. 5, 2008; 25 pages.
Final Office Action for U.S. Appl. No. 11/156,213 mailed on Jun. 15, 2009; 9 pages.
Non-Final Office Action for U.S Appl. No. 11/156,213 mailed on Jan. 28, 2010; 9 pages.

* cited by examiner

*Primary Examiner* — Chanh Nguyen
*Assistant Examiner* — Allison Walthall
(74) *Attorney, Agent, or Firm* — Kilpatrick Townsend & Stockton LLP

(57) ABSTRACT

Embodiments of the present invention provide programmable keys in a keyboard that provide the user with added functionalities and versatility to enhance the usage of the computer for game play or the like. In one embodiment, an input device for use with a computer comprises an input device housing; at least one input member disposed on the input device housing; and an auxiliary display connected to the input device housing, the auxiliary display being configured to display information received from the computer including images provided by the computer.

27 Claims, 3 Drawing Sheets

KEYBOARD WITH INTEGRATED AUXILIARY DISPLAY

CROSS-REFERENCES TO RELATED APPLICATIONS

The application is related to commonly assigned, concurrently filed U.S. patent application Ser. No. 11/156,213 entitled "Keyboard with Programmable Keys."

BACKGROUND OF THE INVENTION

This invention relates to computer keyboards and, more particularly, to a computer keyboard having programmable keys and an auxiliary display to provide additional functionalities and enhance the usage of the computer, including game play functionalities.

The personal computer (PC) is being used more frequently as a media center (e.g., a HiFi installation), communication center, and the like. To more fully utilize the PC and provide more versatility of user control, additional devices or features will need to be implemented. One example involves the use of the PC for game play.

BRIEF SUMMARY OF THE INVENTION

Embodiments of the present invention provide features in a keyboard that provide the user with added functionalities and versatility to enhance the usage of the computer for game play or the like. To enhance a keyboard for game play, existing keys or other input members can be assigned different functions for game play and additional keys or other input members can be provided specifically for game play. Programmable function keys can be programmed to have multiple functions associated with multiple shift states. The user can program those function keys to perform macros while the application using the macros is running. Moreover, an auxiliary display in the keyboard can be used to display images and/or text provided by the host system to improve the usage of the computer and to provide the user with information that can enhance the user's experience.

According to an aspect of the present invention, a keyboard for use with a computer comprises a plurality of keys which include a plurality of programmable function keys each being programmable to have multiple shift states to provide different macro functions among the multiple shift states to be inputted to the computer; a plurality of macro shift buttons which represent the multiple shift states and which are configured to be pressed to toggle among the multiple shift states for the plurality of programmable function keys; and a macro record button configured to start and stop macro recording of the macro functions of the programmable function keys.

In some embodiments, the macro record button is configured to start and stop macro recording during execution of an application in the computer to provide macro recording of tasks to be performed in the application. The application is a computer game, and the macro record button is configured to start and stop macro recording during game play to provide macro recording of tasks to be performed in the computer game. A keyboard microcontroller has a macro program to perform macro recording. The macro program includes code for starting macro recording upon receiving a key press signal of the macro record button; code for identifying one of the plurality of programmable function keys upon receiving a key press signal of the one programmable function key; code for storing one or more input signals as the macro to be associated with the one programmable function key; and code for stopping macro recording upon receiving another key press signal of the macro record button. The macro program may further include code for playing back the one or more input signals as the macro associated with one of the programmable function keys upon receiving a key press signal of the one programmable function key.

In specific embodiments of the present invention, the keyboard further comprises a standard interface for interfacing with the computer; and an enhanced interface for interfacing with the computer. The enhanced interface is configured to permit key press signals from any key of the keyboard to pass therethrough to the computer; and the standard interface is configured to permit key press signals from only keys of the keyboard which are not programmed to include a macro representing one or more input signals.

In some embodiments, an indicator system is provided to indicate selection of one of the multiple shift states by pressing one of the plurality of macro shift buttons. The indicator system may comprise an auxiliary display to display selection of one of the multiple shift states by pressing one of the plurality of macro shift buttons. The indicator system may comprise an LED for each of the plurality of macro shift buttons which lights up to indicate selection thereof. The indicator system may comprise an backlighting LED system having a plurality of colors each associated with one of the multiple shift states. An indicator system is provided to indicate status of macro recording based on pressing of the macro recording button to start or stop macro recording of the macro functions of the programmable function keys. The indicator system may comprise an LED for the macro recording button which lights up to indicate start of macro recording and turns off to indicate stop of macro recording.

In accordance with another aspect of the present invention, a keyboard for use with a computer comprises a plurality of keys which include a plurality of programmable fiction keys each being programmable to have multiple shift states to provide different macro functions among the multiple shift states to be inputted to the computer; a plurality of macro shift buttons which represent the multiple shift states and which are configured to be pressed to toggle among the multiple shift states for the plurality of programmable function keys; and a keyboard microcontroller having a macro program to perform macro recording of the macro functions of the programmable function keys, the macro program including code for identifying one of the plurality of programmable function keys upon receiving a key press signal of the one programmable function key; and code for storing one or more input signals as the macro to be associated with the one programmable function key.

In accordance with another aspect of the invention, an input device for use with a computer comprises an input device housing; at least one input member disposed on the input device housing; and an auxiliary display connected to the input device housing, the auxiliary display being configured to display information received from the computer including images provided by the computer.

In some embodiment, the auxiliary display comprises a bit-mapped LCD display. One or more keys are associated with content being displayed on the auxiliary display and used to manipulate the content being displayed. An input device microcontroller has an auxiliary display program to control content to be displayed on the auxiliary display. The auxiliary display program comprises code for determining which one of a plurality of contents associated with a plurality of applications being executed in the computer to display on the auxiliary display. The auxiliary display program may further comprise code for receiving user input to specify which one of the plurality of contents associated with the plurality of applications being executed in the computer to display on the auxiliary display.

In specific embodiments, the code for determining may comprise code for automatically cycling through the plurality of contents associated with the plurality of applications at a preset rate. The code for determining may comprise code for receiving user input to pause or resume cycling or to advance faster than the preset rate. The code for determining may comprise code for automatically cycling through the plurality of contents associated with the plurality of applications at a display rate representing the content per display time, the display rate for each content being dependent on priority information associated with the content, the display rate increasing as the priority decreases. The code for determining may comprise code for randomly selecting from the plurality of contents to be displayed which is weighted by priority information associated with the content, the content with higher priority being selected more frequently. The code for determining may comprise code for selecting from the plurality of contents based on a latest application that is mostly recently started and not terminated. The code for determining may comprise code for tracking display time of each application and monitoring priority information associated therewith; code for identifying an application having display time and priority information which exceed a preset threshold; and code for lowering the priority of the identified application. The code for determining may comprise code for controlling display of the plurality of contents based on priority information associated with the contents, and code for activating an indicate light on the input device housing when the content with a high priority exceeding a preset threshold is selected to be displayed on the auxiliary display.

In some embodiments, an input device microcontroller has an integration program to integrate applications being executed in the computer with an auxiliary display program to control content to be displayed on the auxiliary display, so as to display information from any of the applications while one of the applications is being executed in the computer and displayed on a primary display of the computer. The application executed in the computer and displayed on the primary display of the computer is a computer game.

In specific embodiments, the input device is selected from the group consisting of a keyboard, a joystick, a game pad, and a steering wheel. If the input device is a keyboard, the input device may further comprise a mode switch to switch the keyboard between a desktop mode and a game mode, the keyboard functioning as a desktop keyboard in the desktop mode and as a game keyboard in the game mode. The keyboard includes keys which are unique to the keyboard mode and which are disabled in the game mode. The unique keyboard mode keys include a Windows™ key and a Context Menu key. The mode switch is configured to change functionality of a peripheral device connected with the keyboard. A keyboard microcontroller has a timeout module to return the keyboard to the desktop mode if the computer fails to communicate with the keyboard within a preset time period after the mode switch is set to the game mode.

DETAILED DESCRIPTION OF THE INVENTION

Figure 1:
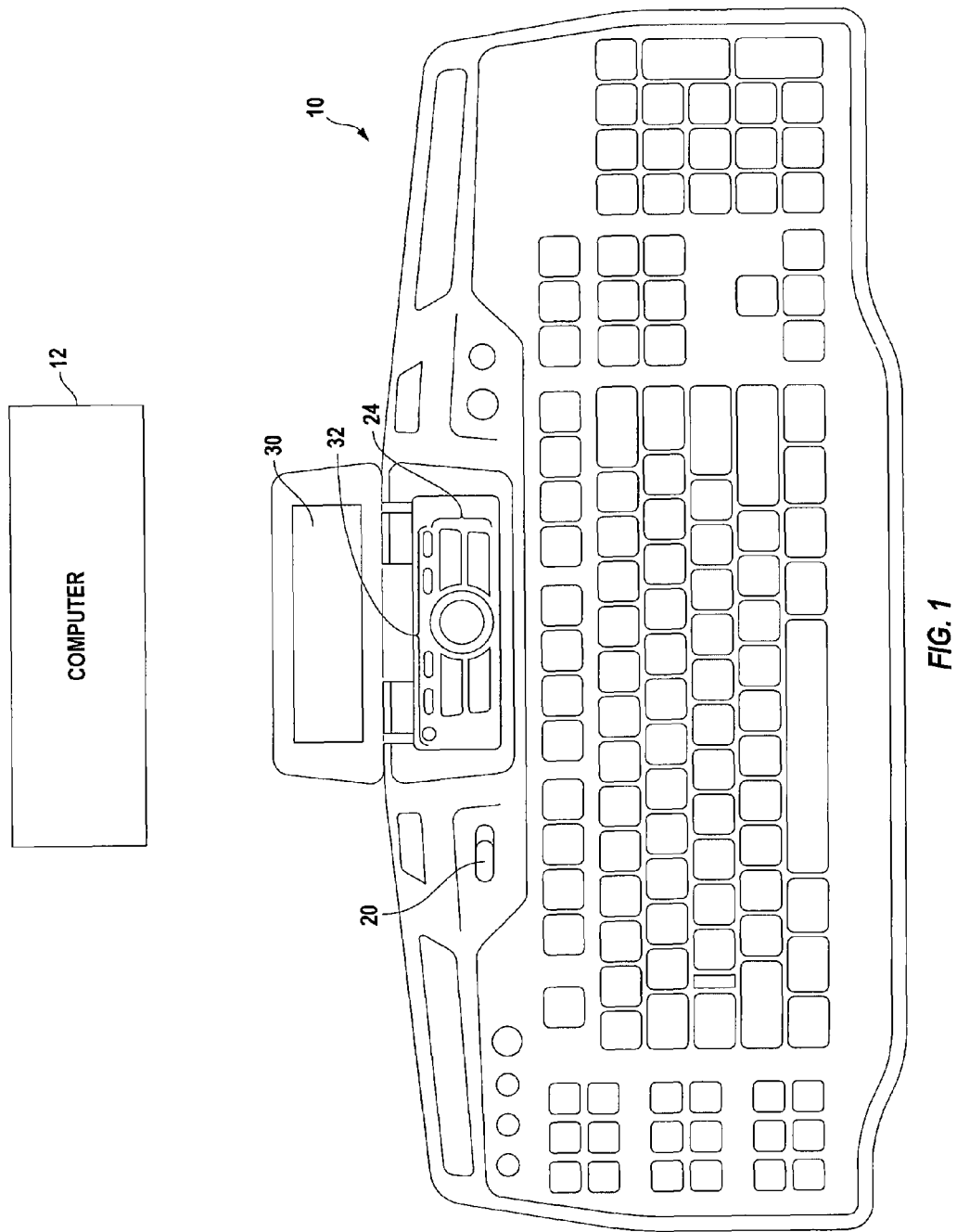
FIG. 1 is a schematic view of a keyboard for use with a computer according to an embodiment of the present invention.

FIG. 1 shows a computer keyboard 10 for use with a host system or computer 12. The keyboard 10 contains keys and buttons that appear in many regular keyboards, including those for a Windows™ layout. The keyboard 10 further includes on the left side a set of programmable function keys G1 to G18; "Macro Shift" buttons M1, M2, M3; and a "Macro Record" button MR. The features of these programmable function keys will be described in detail below. A mode switch 20 switches the keyboard mode between the game mode and the desktop mode. In the desktop mode, the keyboard 10 functions as a desktop keyboard with an operating system such as Windows™. In the game mode, the mode switch 20 disables certain keys that are unique to desktop mode operation such as the Windows™ key and the Context Menu key which, if enabled and accidentally pressed, would disrupt game play. This may be referred to as the "on board" ability of the keyboard 10 to prevent reporting of specific key presses to the host system 12. The mode switch 20 may further cause changes in the functionalities of certain peripheral devices, such as causing SetPoint mouse software to change behavior to work better in game play. A timeout mechanism provided in the keyboard's microcontroller returns the keyboard 10 to the standard functionality in desktop mode if the host system 12 fails to communicate with the keyboard 10 within a preset time period after the mode switch 20 is set to the game mode. A media center 24 includes media keys such as volume up/down, track forward/back, play/pause, stop, mute, and the like. The keyboard 10 further includes an auxiliary display such as an LCD screen 30 with soft keys 32 associated therewith, as described in detail below. The keyboard 10 may include an integrated four-port full-speed USB hub for internal devices (e.g., keyboard and LCD) and external devices via external ports (e.g., audio and mouse). The keyboard 10 may further include backlighting or top-lighting for the keys for playing in the dark. Another feature that may be included in the keyboard 10 is firmware that provides the ability to report any combination of any number of simultaneous key presses (e.g., up to eight or more simultaneous key presses) plus all modifier keys such as Shift and Control.

Programmable Function Keys

The programmable function keys G1-G18 have three toggleable shift states: the unshifted M1 state and two shifted states M2 and M3 by pressing one of the macro shift buttons M1, M2, M3. The keyboard 10 includes macro software capable of allowing the user to program the keys G1-G18 to either a single key press, strings of key presses, or even more complex macros involving other inputs. Without software installed to shift the states, the function keys G1-G18 may mimic other function keys (e.g., F1-F12 and others), or are otherwise usable by default OS drivers. Of course, the number and arrangement of programmable function keys and the number of toggleable shift states may be different in other embodiments.

At least some of the programmable function keys G1-G18 may be pre-programmed. Those keys may also be programmed during game play or some other computer application. The macro record button MR is used to start and stop macro recording. Using a feature referred to as the "on-the-fly" macro recording, the user can record macros of tasks (typically common tasks) during game play while the keyboard 10 is in-game. To record on-the-fly, the user presses the MR key, press the programmable function or macro key (any of G1 to G18), enters the key press(es) or other inputs to assign to the macro key, and press the MR key again to end the macro recording session. This is merely an example of macro recording, and other ways of macro recording may be used in other embodiments.

Figure 2:
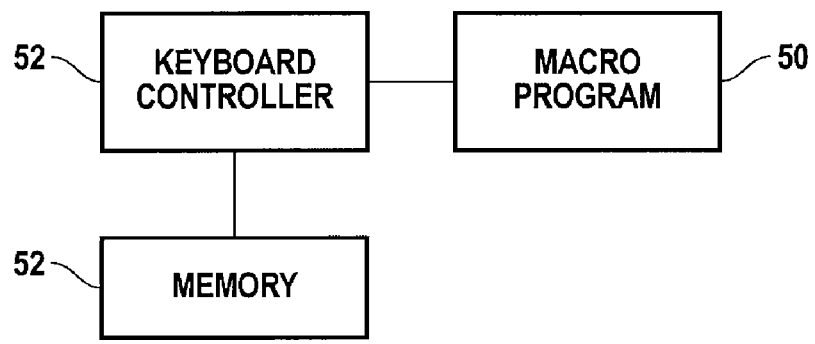
FIG. 2 is a simplified schematic diagram of the configuration of the keyboard according to an embodiment of the present invention.

The macro recording and playback may occur locally in the microcontroller of the keyboard 10 or in the host system 12. Each programmable function or macro key G1-G18 represents a single key macro. In the exemplary embodiment, the macro recording software or macro program 50 is executed by the microcontroller 52 of the keyboard 10, as shown in FIG. 2. The macro (i.e., the one or more key presses or other input) for each macro key G1-G18 is stored locally in the memory 54 of the keyboard 10 during the macro recording. The macro playback also occurs locally within the keyboard 10, so that the press of a single macro key G1-G18 will be translated into the corresponding keystroke sequence or other input stored in the keyboard 10. Providing the macro recording/playback program locally in the keyboard 10 avoids the need and delay of sending the macro key press to the host system 12 and translating the macro key press into the corresponding keystroke or other input by the host driver.

Figure 3:
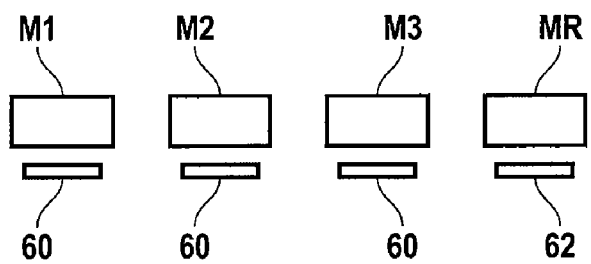
FIG. 3 is a simplified view of an indicator system for the programmable function or macro keys and the macro shift button in the keyboard according to an embodiment of the present invention.
Figure 4:
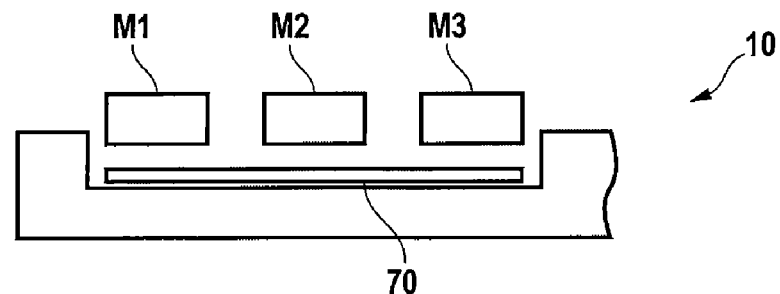
FIG. 4 is a simplified view of an indicator system for the programmable function or macro keys in the keyboard employing one or more backlighting LEDs according to an embodiment of the present invention.

The keyboard 10 may include an indicator system such as an LED indicator system to visually distinguish between the three macro sets of the function keys G1-G18. In one embodiment as seen in FIG. 3, the indicator system includes three LEDs 60 for the three macro shift buttons M1-M3. When a macro shift button is selected, the LED for the selected macro shift button lights up. The three LEDs 60 may have different colors. Furthermore, a separate MR status LED 62 may be provided to light up the macro record MR button when it is pressed to activate macro recording process; the LED 62 is turned off when it pressed again to end the macro recording process. In another embodiment as shown in FIG. 4, the indicator system includes one or more backlighting LEDs 70 with three different colors (e.g., blue/red/green) for the three macro sets (M1/M2/M3). The backlighting LEDs 70 may illuminate the programmable function or macro keys G1-G18 instead of or in additional to the macro shift buttons M1, M2, M3.

Interface Between Keyboard and Host System

Figure 5:
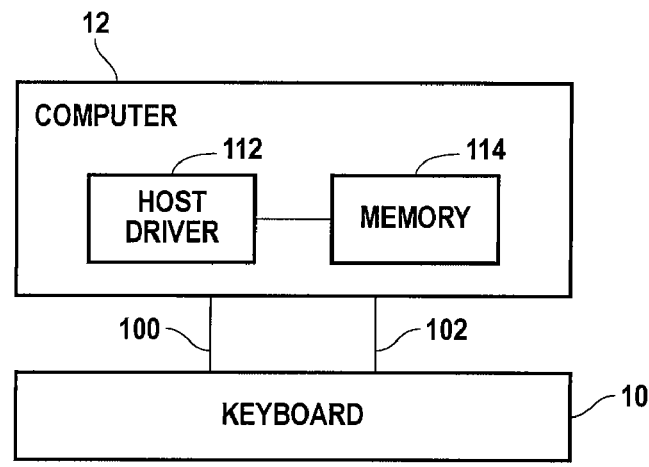
FIG. 5 is a simplified schematic view illustrating two logically independent interfaces between the keyboard and the computer according to an embodiment of the present invention.

Another feature of the system is that the keyboard 10 may report keyboard events to the host system 12 via two logically independent interfaces, namely, standard interface 100 and enhanced interface 102, as shown in FIG. 5. Some keys including the programmable function keys G1-G18 are modified to represent macros such as macro keystrokes or other inputs, while other keys are unmodified. The key press of an unmodified or "standard" key is allowed to be transmitted through either the standard interface 100 or the enhanced interface 102 from the keyboard 10 to the host system 12. The key press of a modified or "enhanced" key, however, is allowed to be transmitted through the enhanced interface 102 only. The host system 12 may receive information from the keyboard 10 identifying the enhanced keys and store the information in the host memory 114. Based on the stored information, the host driver 112 of the host system 12 may mask or prevent reporting of key presses of the enhanced keys through the standard interface 100. The press of an enhanced key, which represents a macro input such as macro keystroke(s), will be transmitted only through the enhanced interface 102.

Auxiliary Display—LCD Screen

As shown in FIG. 1, the LCD screen 30 is preferably an integrated back or top lit monochrome LCD screen capable of displaying text and simple images. In a specific embodiment, the LCD screen 30 may display 3-5 lines of text with 25-30 characters per line, and may display simple images such as logos, ammo count for game play, emoticons, or the like. The LCD screen 30 may be a bit-mapped display. It serves as an auxiliary display that is preferably used by the host system 12 to display information provided by the host system 12, instead of status of other information that is local to the keyboard 10. In a specific embodiment, the LCD screen 30 is used to display game information while a game application is being run in the host system 12. Alternatively, the LCD screen 30 may be used to display the selection of the macro shift keys (M1/M2/M3) and the status of macro recording MR. The position of the LCD screen 30 may be changed by using an adjustable tilt connection to the body of the keyboard 10.

FIG. 1 shows four soft keys 32 provided near the LCD screen 30. The functions of the soft keys 32 are tied to or associated with the content of the display. For example, if the LCD screen 30 is used to display the computer application being run in the host system 12, then one of the soft keys 32 may be used to cycle or scroll through the available computer applications as each is displayed on the LCD screen 30. Another soft key 32 may be used to scroll through several options and select what is to be displayed on the LCD screen 30. Yet another soft key 32 may be used to reset a clock that is displayed on the LCD screen 30. The soft keys 32 are touch activated keys, and may be replaced by regular keys instead in other embodiments.

In another feature, the LCD portion of the keyboard software is made publicly available through an SDK (software developer's kit) that will be available to game developers and enthusiasts, who will program the LCD portion to employ LCD screen 30 as an auxiliary display for custom-designed purposes. Gaming software tools such as applets or plug-ins may be provided that use the LCD screen 30 and make it useful even in the absence of any support by third-party applications. Examples of what can be displayed on the LCD screen 30 include clock, timer, media player information (track, time, volume, etc.), e-mail notification, IM (instant messaging) notification, and the like.

The keyboard 10 may further include a virtual auxiliary display or virtual LCD feature whereby each "client" or application can write its output to the virtual LCD which may or may not be shown on the physical LCD screen 30. This feature is useful when several applications are running in the host system 12 simultaneously, and it is not necessary or practical to display what each application or client is doing on the LCD screen 30 at the same time. For example, if a clock is normally displayed and a game is being played, it may be desirable to display the game's output on the LCD screen 30 instead of the clock. Having the user terminate the clock before starting the game and then restarting the clock after quitting the game would not be practical.

Figure 6:
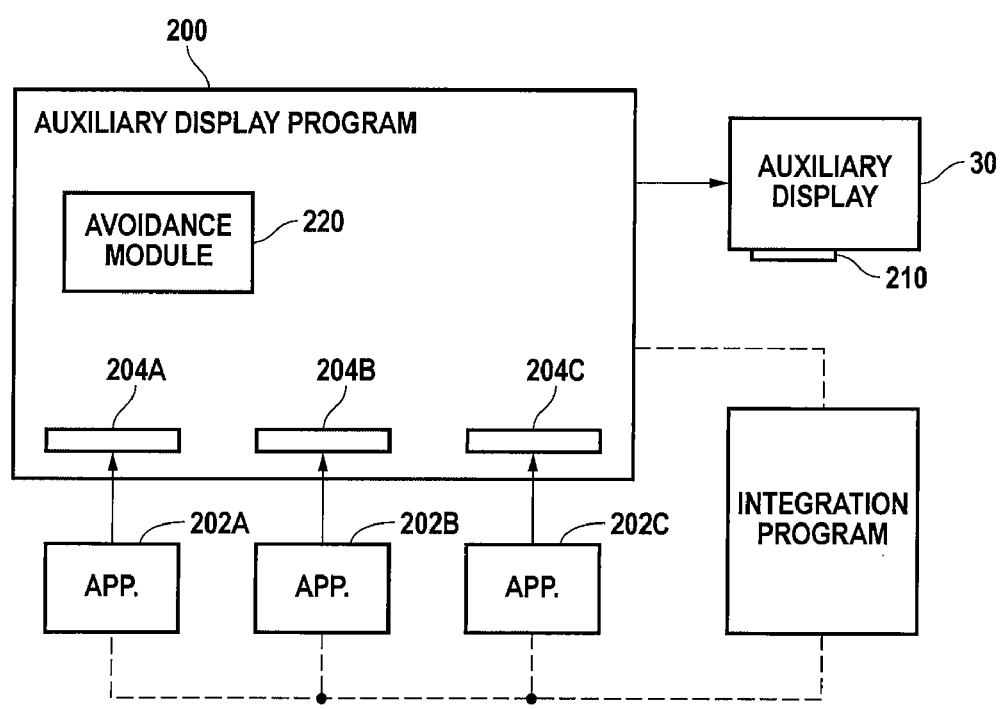
FIG. 6 is a simplified block diagram of the auxiliary display program for the auxiliary display screen in the keyboard according to an embodiment of the present invention.

What is shown on the LCD screen 30 can be determined by a priority ranking provided to the auxiliary display program or LCD program 200, as illustrated in FIG. 6. Every client or application 202 (202A, 202B, 202C) has a virtual auxiliary display or a virtual LCD 204 (204A, 204B, 204C) and can write its output to the virtual display 204 (204A, 204B, 204C), which may or may not be shown on the physical LCD screen 30. In addition to submitting the information that may be displayed (e.g., a bitmapped image), the client 202 will also tag the image with a certain "priority" which indicates how crucial it is to display the image. For example, if a timer is started to perform a count down, the countdown procedure is typically not important until at or near the expiration time. Thus, the timer will give its countdown image a low priority until it is within a few seconds of the expiration, at which time it can be switched to a higher priority and then it can end the timer function with the highest priority at the expiration time. The priority information provided by the client or application is an input to the LCD program 200 that helps schedule the various clients 202 to get screen time on the LCD screen 30. In addition, the LCD screen 30 may include an indicator light or backlight 210 that lights up or flashes when a very high priority input is received from the LCD program 200 to direct the user's attention to the auxiliary display 30.

A number of scheduling mechanisms can be used to schedule screen time for the clients 202 to display information on the auxiliary display 30. One simple mechanism is to let the user choose. User intervention is used to display another application or client different from the one currently shown on the display 30. For instance, the user can press one of the soft buttons 32 (see FIG. 1) to scroll through all the available clients' images and switch over to the desired one.

According to another scheduling mechanism, the LCD program 200 automatically cycles through the currently available images in the virtual LCDs 204 at preset intervals, which may be regular intervals (e.g., 2 seconds per image). This may be combined with the user intervention feature to allow the user to pause/resume cycling, or advance faster than the preset rate. The user may use the soft buttons 32 to perform such intervention.

Another scheduling mechanism automatically cycles through the clients' images, but also takes priority into account. Instead of using a fixed time interval, the display time can be adjusted according to the priority of the client or application. The higher the priority, the longer the display time will be on the LCD screen 30. In a specific implementation of this approach, the display time for a very low priority image may be zero, so that the image will be skipped. A variation of this approach is to employ a fixed cycle time, but use the priority measure associated with the image to influence the probability of being displayed on the LCD screen 30. In this scenario, the "next screen" will be randomly selected from the available clients or applications 202, weighted by the associated priority levels.

In yet another scheduling mechanism, the latest application or client 202 that was started will get the screen time of the LCD screen 30. When this latest application stops using the screen, the previously displayed one will be restored, and so on. As an example, this works well for the situation where there is a "normal screen" with a clock, along with a game that is LCD-enabled. During the game, the user will see the game's output, and when returning to the desktop application, the clock will reappear on the screen.

Some applications or clients, either by mistake or by design, may be putting up screens with the priority turned up unreasonably high, thereby forcing their way to the top of the priority list. One example involves an advertisement that keeps flashing itself to the front. To address this problem, the LCD program 200 may include an avoidance module 220. For example, the avoidance module 220 has an accounting or quota mechanism whereby the use of the LCD screen 30 by the applications 202 is tracked, and their priority behavior is monitored. If a certain preset threshold (e.g., high priority and high usage of the LCD screen 30 for extended time period) for a client 202 is reached, the avoidance module 220 can adjust the priority of that client down to prevent it from dominating the LCD screen 30. This may be carried out with the equivalent of a low pass filter on the priority input from the clients. In addition, the user may be allowed to disable specific clients or applications to prevent their images from being displayed on the LCD screen 30.

Another useful feature that can be implemented is to provide integration software program 230, as seen in FIG. 6, that helps the user integrate IM clients, VOIP software, and other gaming software tools (as clients 202) with the LCD program 200 and LCD screen 30. For example, the user will be able to get server IP numbers over a web browser such as Yahoo!®, switch channels in TeamSpeak™, and carry out other similar activities without having to drop out of the game. The use of the LCD screen 30 as an auxiliary display adds functionalities to the keyboard 10 and enhances the usage of the computer 12.

The above-described arrangements of apparatus and methods are merely illustrative of applications of the principles of this invention and many other embodiments and modifications may be made without departing from the spirit and scope of the invention as defined in the claims. For instance, while the above describes a keyboard 10 with an auxiliary display 30, other embodiments may provide the auxiliary display in other input devices such as a game steering wheel, a game pad, a joystick, or the like. The scope of the invention should, therefore, be determined not with reference to the above description, but instead should be determined with reference to the appended claims along with their full scope of equivalents.

What is claimed is:

1. A keyboard for use with a computer, the keyboard comprising:
  a keyboard housing;
  at least one input member disposed on the keyboard housing;
  an auxiliary display integrally formed with the keyboard housing, the auxiliary display being configured to display information received from the computer including images provided by the computer, wherein the information is for a plurality of applications running on the computer; and
  a control circuit configured to run a program to control the display of the information on the display for each application; wherein:
    each application is configured to set a priority level for displaying the information on the display;
  an input device microcontroller having an auxiliary display program to control content to be displayed on the auxiliary display,
  wherein the auxiliary display program comprises code for determining which one of a plurality of contents associated with a plurality of applications being executed in the computer to display on the auxiliary display,
  wherein the code for determining comprises:
  code for tracking a display time of each application and monitoring priority information associated therewith,
  code for identifying an application having display time and priority information which exceed a preset threshold, and
  code for lowering the priority of the identified application;

wherein a display time is a length of time that each application's application information is displayed on the display and is based on the priority level for each application's application information.

2. The keyboard of claim 1 wherein the auxiliary display comprises a bit-mapped LCD display.

3. The keyboard of claim 1 further comprising one or more keys associated with content being displayed on the auxiliary display and used to manipulate the content being displayed.

4. The keyboard of claim 1 wherein the auxiliary display program further comprises code for receiving user input to specify which one of the plurality of contents associated with the plurality of applications being executed in the computer to display on the auxiliary display.

5. The keyboard of claim 1 wherein the code for determining comprises code for automatically cycling through the plurality of contents associated with the plurality of applications at a preset rate.

6. The keyboard of claim 5 wherein the code for determining comprises code for receiving user input to pause or resume cycling or to advance faster than the preset rate.

7. The keyboard of claim 1 wherein the code for determining comprises code for automatically cycling through the plurality of contents associated with the plurality of applications at a display rate representing the content per display time, the display rate for each content being dependent on priority information associated with the content, the display rate increasing as the priority decreases.

8. The keyboard of claim 1 wherein the code for determining comprises code for randomly selecting from the plurality of contents to be displayed which is weighted by priority information associated with the content, the content with higher priority being selected more frequently.

9. The keyboard of claim 1 wherein the code for determining comprises code for selecting from the plurality of contents based on a latest application that is mostly recently started and not terminated.

10. The keyboard of claim 1 wherein the code for determining comprises code for controlling display of the plurality of contents based on priority information associated with the contents, and code for activating an indicate light on the input device housing when the content with a high priority exceeding a preset threshold is selected to be displayed on the auxiliary display.

11. The keyboard of claim 1 further comprising an input device microcontroller having an integration program to integrate applications being executed in the computer with an auxiliary display program to control content to be displayed on the auxiliary display, so as to display information from any of the applications while one of the applications is being executed in the computer and displayed on a primary display of the computer.

12. The keyboard of claim 11 wherein the application being executed in the computer and displayed on the primary display of the computer is a computer game.

13. The keyboard of claim 1, further comprising a mode switch to switch the keyboard between a desktop mode and a game mode, the keyboard functioning as a desktop keyboard in the desktop mode and as a game keyboard in the game mode.

14. The keyboard of claim 13, further including keys which are unique to the keyboard mode and which are disabled in the game mode.

15. The keyboard of claim 14 wherein the unique keyboard mode keys include a windows key and a Content Menu key.

16. The keyboard of claim 13 wherein the mode switch is configured to change functionality of a peripheral device connected with the keyboard.

17. The keyboard of claim 13 further comprising a keyboard microcontroller having a timeout module to return the keyboard to the desktop mode if the computer fails to communicate with the keyboard within a preset time period after the mode switch is set to the game mode.

18. The keyboard of claim 14, wherein the disabled keys in the game mode are configured to disrupt a running program in the game mode if the disable keys were not disabled.

19. The keyboard of claim 1, wherein:
the program includes a plurality of virtual auxiliary displays,
the virtual auxiliary displays are respectively associated with the applications, and
each application is configured to send to its associated virtual auxiliary display the information for the application for storage of the information in the virtual auxiliary display.

20. The keyboard of claim 19, wherein each application is configured to change a priority level for display of the application information in the application's associated virtual auxiliary display.

21. The keyboard of claim 19, wherein each application is configured to change a priority level for display of the application information in the application's associated virtual auxiliary display based on an expiration time for this application information.

22. An auxiliary display configured for use with a computer in addition to the computer's primary display, the auxiliary display comprising:
a housing;
a screen disposed in the housing and being configured to display application information received from the computer including images provided by the computer, wherein the application information is for a plurality of applications running on the computer; and
a control circuit configured to run a program to control the display of the application information on the display for each application; wherein:
each application is configured to set a priority level for displaying the application information on the display;
an input device microcontroller having an auxiliary display program to control content to be displayed on the auxiliary display,
wherein the auxiliary display program comprises code for determining which one of a plurality of contents associated with a plurality of applications being executed in the computer to display on the auxiliary display,
wherein the code for determining comprises:
code for tracking a display time of each application and monitoring priority information associated therewith,
code for identifying an application having display time and priority information which exceed a preset threshold, and
code for lowering the priority of the identified application;
wherein a display time is a length of time that each application's application information is displayed on the display and is based on the priority level for each application's application information.

23. The auxiliary display of claims 22, wherein the housing is included in a human interface device.

24. The auxiliary display of claims 22, wherein the human interface device is a keyboard.

25. The auxiliary display of claim 22, wherein:
the program includes a plurality of virtual auxiliary displays,
the virtual auxiliary displays are respectively associated with the applications, and
each application is configured to send to its associated virtual auxiliary display the application information for the application for storage of the application information in the virtual auxiliary display.

26. The auxiliary display of claim 25, wherein each application is configured to change a priority level for display of the application information in the application's associated virtual auxiliary display.

27. The auxiliary display of claim 25, wherein each application is configured to change a priority level for display of the application information in the application's associated virtual auxiliary display based on an expiration time for this application information.

\* \* \* \* \*